June 2, 1931.  I. SIKORSKY  1,807,939
AIRCRAFT INCLUDING SEAT FOR SAME
Filed May 7, 1929  3 Sheets-Sheet 1
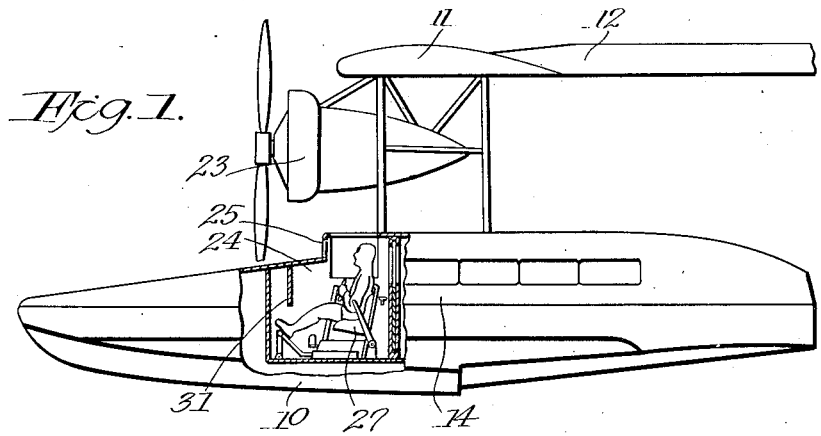
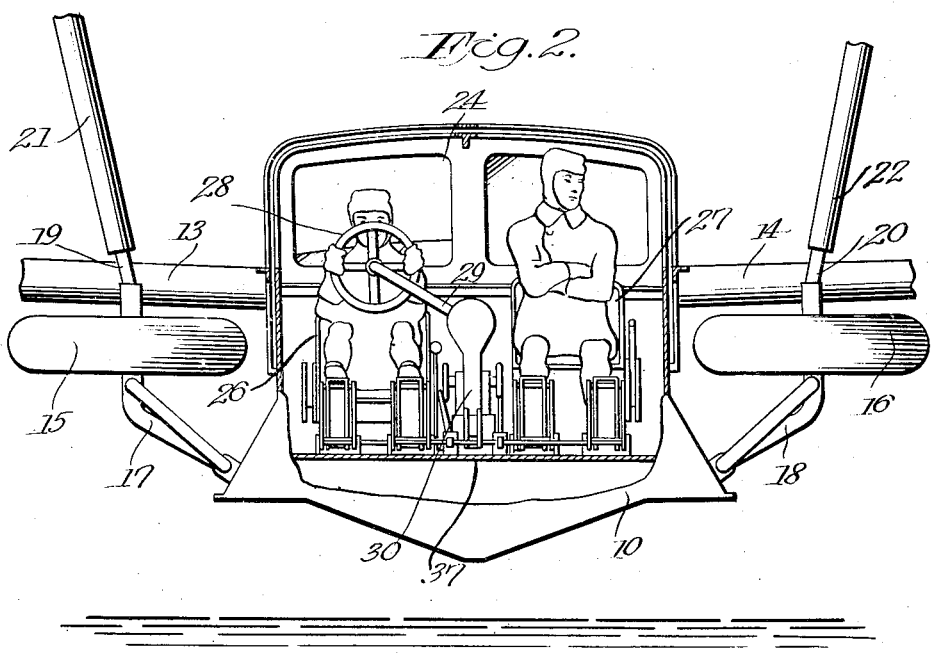
Igor Sikorsky
INVENTOR
BY
ATTORNEY June 2, 1931.  I. SIKORSKY  1,807,939
AIRCRAFT INCLUDING SEAT FOR SAME
Filed May 7, 1929  3 Sheets-Sheet 2
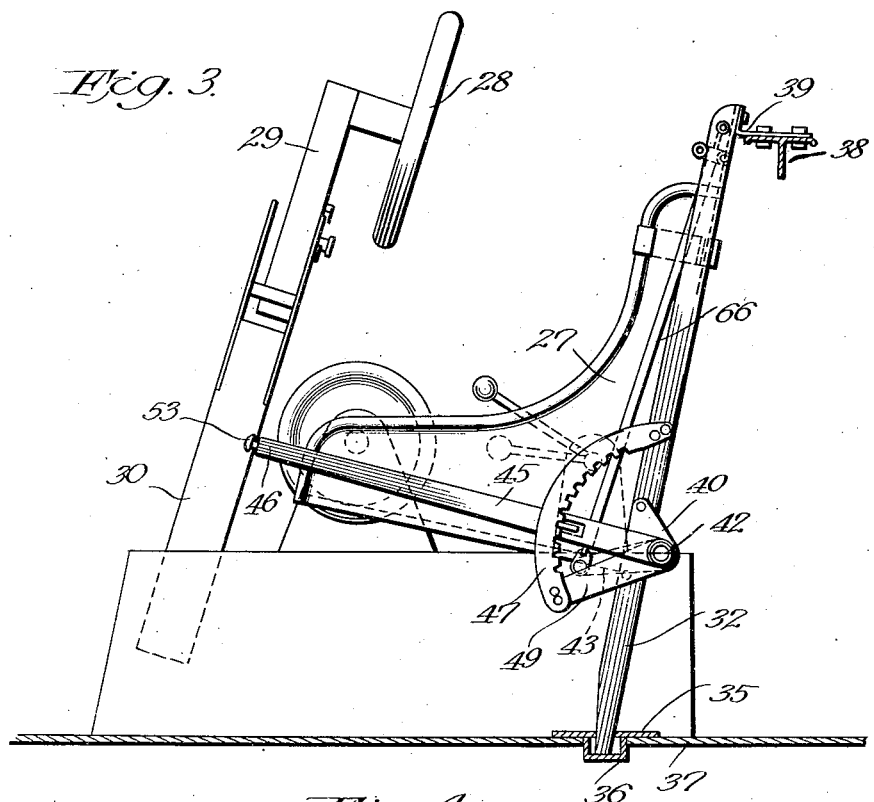
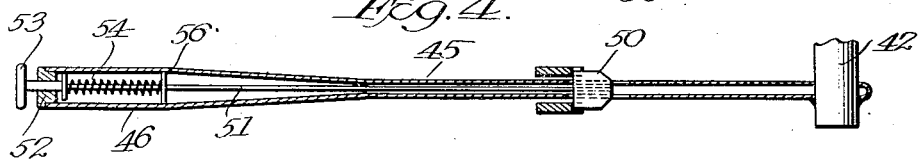
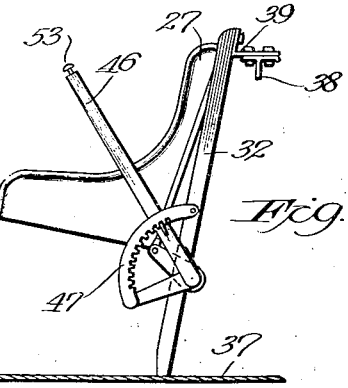
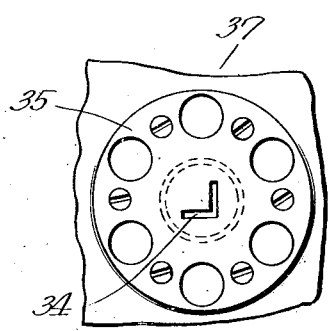
Igor Sikorsky
INVENTOR
BY
ATTORNEY

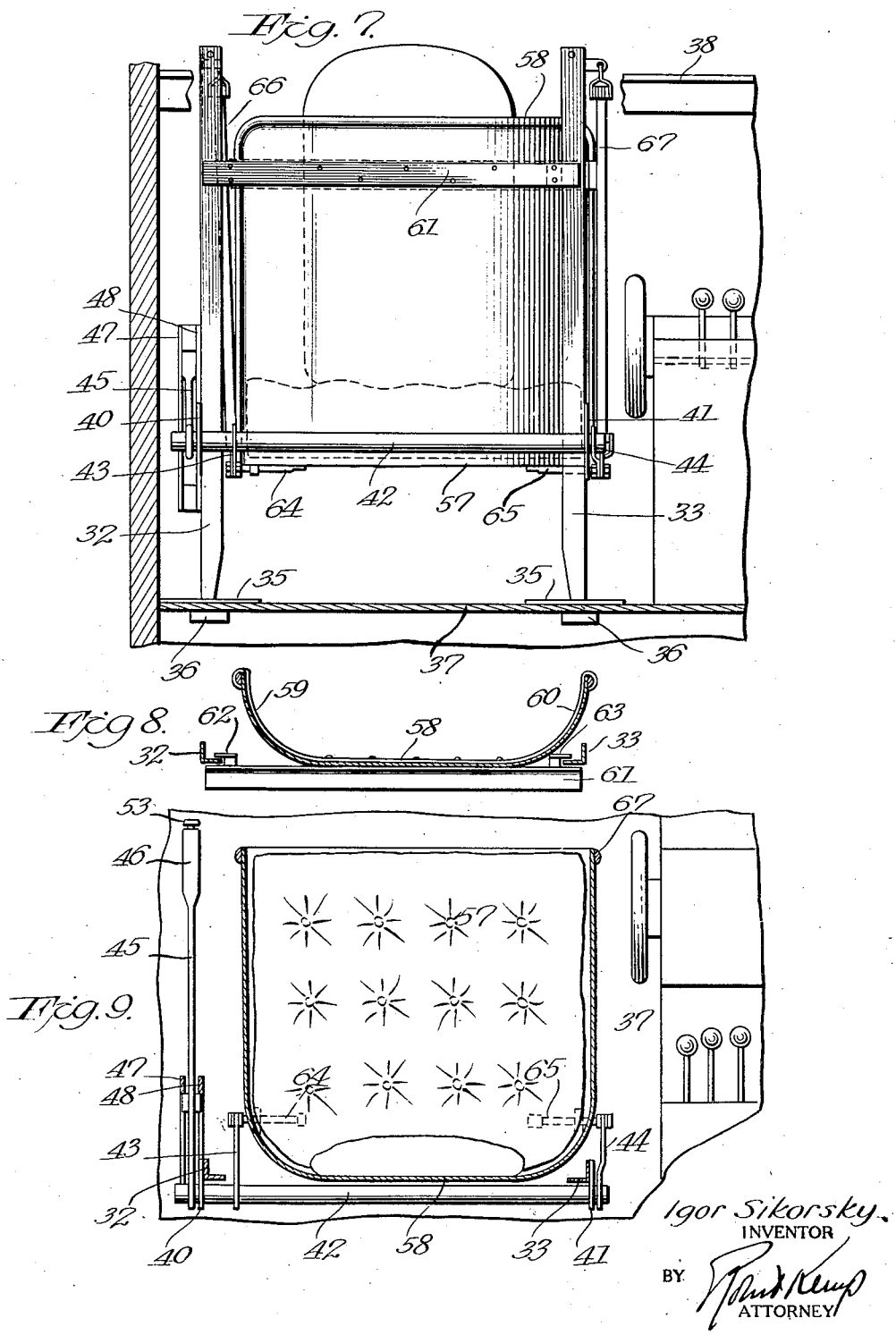

Patented June 2, 1931

1,807,939

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AIRCRAFT INCLUDING SEAT FOR SAME

Original application filed January 19, 1929, Serial No. 333,603. Divided and this application filed May 7, 1929. Serial No. 361,177.

The present invention relates to aircraft, and, more particularly, to the arrangement of the pilot's compartment, including the relation of such compartment relative to an aircraft, and the arrangement and construction of seats within the compartment.

While the invention has general application to aerial vehicles of all kinds, it will be described with reference to an amphibian including a body boat having therein a pilot's compartment with a plurality of seats arranged side by side.

In the drawings:

Figure 1 is an elevation of an amphibian (the empennage being omitted), the body boat being shown with its side at the pilot's compartment broken away.

Figure 2 is a transverse section through the pilot's compartment.

Figure 3 is a side elevation of a seat arranged within the compartment.

Figure 4 shows in longitudinal section an operating lever whereby the height of the seat may be adjusted.

Figure 5 is a view generally similar to that of Figure 3, but with the seat shown in a different position of adjustment.

Figure 6 is a plan view of a seat mounting element.

Figure 7 is a rear elevation of the seat.

Figure 8 is a horizontal section through the back of the seat, and

Figure 9 is a horizontal section taken just above the bottom of the seat.

Referring to the drawings, 10 represents a body boat disposed beneath a main plane 11, rearwardly of the center section of which a pair of out-riggers, one being shown at 12, project, the out-riggers supporting at their rearward extremities an empennage, which is not shown. Lower wings 13 and 14 project laterally from each side of the body boat.

In order to permit the amphibian to be landed on the ground, landing wheels 15 and 16 are provided, these being mounted on axle brackets 17 and 18, which are pivoted to the body boat for swinging movement about substantially horizontal axes. Rods 19 and 20 are pivotally connected to the outer ends of the axles upon which the wheels are mounted, these rods having at their upper ends piston heads working in cylinders 21 and 22, which latter at their upper ends are in pivotal connection with the main plane structure. By means of apparatus described in my application Serial No. 333,603, filed January 19, 1929, of which this application is a division, fluid under pressure may be admitted into cylinders 21 and 22 at either side of the piston heads, so that rods 19 and 20 may be projected relative to the cylinders to move the wheels to an operative position, wherein they lie in substantially vertical planes, or to retract the rods to lift the wheels to the inoperative position shown in Figure 2, wherein they lie in substantially horizontal planes, immediately in advance of the lower planes.

The amphibian is provided with a pair of motors, of which one is shown at 23, symmetrically disposed at either side of the vertical axial plane of the body boat, the motors driving tractor propellers revolving somewhat in advance of the main plane.

The pilot's compartment is designated as a whole by the numeral 24, and, as may be clearly seen from Figure 1 is disposed somewhat forwardly of the central portion of the body boat. The body boat is entirely roofed in, the roof being downwardly stepped transversely of the pilot's compartment to present a substantially vertical forwardly faced frame, in which is disposed a transparent window 25. To the rear of window 25 the side walls and roof are provided with a continuous transverse opening of suitable width, the edges of the opening being provided with guideways adapted to receive suitable closure means. The opening affords continuous vision from the interior of the compartment from one side and above to the other side of the body boat, and it will be noted that its disposition enables the position of the landing wheels and the operation of the motors to be clearly observed.

Within compartment 24 a pair of seats 26 and 27 are arranged side by side substantially in the planes of the transverse observation opening just described. A control wheel, control pedals, engine controls, etc., are suitably arranged relative to the seats so that the machine may be controlled by either pilot. In this connection it may be stated that the control wheel 28 is supported on arm 29 pivoted to the elevator control lever 30, so that it may be swung from one side of the compartment to the other within convenient reach of either pilot. An instrument board 31, Figure 1, is arranged in front of the seats below window 25.

In order that the seats may accommodate pilots of different stature, and in order that the pilots may be properly able to make suitable observations laterally or forwardly, or to navigate entirely by the instruments, I have provided means for adjusting the height of the seats independently of each other.

According to Figure 2, the pilot at the right is in control of the machine, and has lowered his seat in order that the instruments on instrument board 31 may be conveniently viewed. Seat 27, on the other hand, is raised in order to bring the head of the pilot in that seat immediately behind window 25, so that a forward view may be obtained. Thus each pilot is in the most convenient position for the purpose, and there is no danger that the attention of either will be distracted from his particular observations. The pilot in seat 27 moreover is in position to observe whether or not wheel 16 has been properly adjusted for landing on water, or on the ground, and when the machine is to be brought down, the pilot at the right may place himself in position to observe the disposition of wheel 15 by suitably elevating his seat 26.

The construction of the seats is the same in each instance, and, consequently, only one need be considered in detail. Accordingly, seat 27 has been illustrated in Figures 3 to 9, and alone will be described.

The seat is supported on a pair of upright angle bars 32 and 33, whose lower ends pass through an angular slot, as at 34, Figure 6, in a plate 35 into a cup 36 welded to the latter. The margins of plate 35 rest on, and are secured to, the floor 37 of the pilot's compartment, while the cup is passed through a suitable aperture in the floor. The bottom walls of cups 36 support the weight of the chair, this weight being distributed by plates 35. The upper ends of bars 32 and 33 are secured to a transverse structural member 38, through angle brackets 39.

At a suitable distance above the floor, plates 40 and 41 are secured to bars 32 and 33, these plates having rearwardly extending portions in which is journalled a shaft 42. Rigidly secured to shaft 42 are forwardly extending arms 43 and 44 in parallel relation. An elongated lever 45, provided with a handle 46, is also fixed in a forwardly extending relation to shaft 42. A pair of internally toothed segments 47 and 48 are secured at their lower ends to an arm 49, rigidly supported by member 32, and at their upper ends to member 32 itself. The teeth of the segments are arranged on similar arcs having shaft 42 as their center, and lever 45 projects between them, as is most clearly shown in Figure 9.

Lever 45 and handle 46 have spaced lateral walls, as is illustrated in Figure 4, these walls immediately inwardly of the segments being slotted to receive a slidable latch member 50. A push pin 51 is disposed between the walls of the lever and handle with its inner end fixed to latch 50. The outer end of push pin 51 is guided in a block 52, and is provided at its extremity with a button 53. A spring 54 is interposed between a flange 55, fixed to the push pin, and an abutment 56 fixed in handle 46. It will be obvious that spring 54 will cause engagement of latch 50 with the toothed segments, this engagement being releasable by inward movement of push pin 51 through button 53. When the latch is thus released lever 45 may be suitably adjusted and locked in adjusted position upon re-engagement of the latch. Any angular movement of lever 45 is, of course, participated in by arms 43 and 44.

The seat comprises a bottom 57, a back 58, and lateral wings 59 and 60. At its upper end the seat has secured thereto a transversely extending angle bar 61, which projects over the rear margins of members 32 and 33. Angle clips 62 and 63, secured to bars 61 engage over the forward margins of members 32 and 33, and prevent displacement of bar 61 and the seat transversely of the latter members, while at the same time permitting relative vertical adjustment. Laterally projecting pins 64 and 65 are secured to the seat bottom with their projecting ends journalled in apertures in the distal ends of arms 43 and 44. The distal ends of the latter arms also have secured thereto the lower ends of elastic tension members 66 and 67, which, at their upper ends, are anchored to brackets projecting from the tops of members 32 and 33.

From the above description it will be evident that upon manipulation of lever 45 the seat will be vertically displaced in dependence upon the movement of arms 43 and 44. Handle 46 is within convenient reach of the occupant of the seat, and the leverage arrangement is such that the occupant may raise or lower the seat without moving from it. Tension members 66 and 67 aid in the upward movement of the seat, and may be so chosen as to be of a combined strength sufficient to substantially balance the weight of the seat occupant.

From the above it will be understood that my invention relates not only to a new general combination of elements in a pilot's compartment, but also to specific improvements in pilots' seats. I do not, of course, limit myself to the exact structural details shown and

I claim:

1. An adjustable seat for aircraft pilots comprising the combination of frame members, a seat slidably mounted within said frame members and a lever connected to said seat and to said frame members for sliding said seat in relation to said frame members.

2. An adjustable seat for aircraft pilots comprising the combination of a frame, a seat slidably mounted within said frame, resilient means attached to said seat and said frame, a lever connected to said seat and said frame for sliding said seat in relation to said frame, and means for locking said lever in a fixed position.

3. An adjustable seat for aircraft pilots comprising the combination of an approximately vertical upwardly and downwardly sliding seat, lever means for sliding said seat and resilient means for assisting in the movement of said lever.

4. An adjustable seat for aircraft comprising, a seat mounting, a seat mounted slidably with reference to said seat mounting, said seat slidable upwardly and downwardly in a vertical or in an approximately vertical direction, resilient means between said seat and said mounting, a lever positioned at the side of said seat and adapted to slide said seat in relation to said seat mounting.

5. An adjustable seat for aircraft comprising, a seat mounting, a seat mounted slidably with reference to said seat mounting, resilient means between said seat and said mounting, a lever positioned at the side of said seat and adapted to slide said seat in relation to said mounting, and means for locking said lever and said seat in a fixed position.

6. In an aircraft, a pilot's seat, having a back, uprights guiding the upper end of the back for sliding movement, levers supporting the lower portion of the seat, a handle manipulatable to swing the levers and thereby adjust the seat vertically of the guides, and means to lock the seat in adjusted position.

7. In an aircraft, a pilot's seat having a back, uprights guiding the upper end of the back for sliding movement, levers supporting the lower portion of the seat, a handle manipulatable by the pilot while seated to swing the levers and thereby adjust the seat vertically of the guides, and means to lock the seat in adjusted position.

8. In an aircraft, a pilot's seat having a back, uprights guiding the upper end of the back for sliding movement, a longitudinal shaft, a pair of levers rigidly mounted on said shaft and extending in the same direction, said levers supporting the lower portion of the seat at their distal ends, a handle fixed to the shaft whereby the latter may be rocked, and latch means for locking said handle in various positions of angular adjustment.

9. In an aircraft, a pilot's seat having a back, uprights guiding the upper end of the back for sliding movement, a lateral shaft, a pair of levers rigidly mounted on said shaft and extending in the same direction, said levers supporting the lower portion of the seat at their distal ends, tension means connecting the distal ends of said levers with said uprights at points above said shaft, a handle fixed to the shaft whereby the latter may be rocked, and latch means for locking said handle in various positions of angular adjustment.

Signed at College Point, Long Island in the county of Queens and State of New York this 27th day of March A. D. 1929.

IGOR SIKORSKY.